United States Patent [19]

Law et al.

[11] Patent Number: 5,346,264
[45] Date of Patent: Sep. 13, 1994

[54] LIQUID TIGHT INTERNAL SNAP CONNECTOR FOR CONNECTING CORRUGATED PLASTIC CONDUIT

[75] Inventors: Joseph P. Law, Scotch Plains; Robert Oehler, Westfield, both of N.J.

[73] Assignee: Heyco Molded Products, Inc., Kenilworth, N.J.

[21] Appl. No.: 881,024

[22] Filed: May 11, 1992

Related U.S. Application Data

[63] Continuation-in-part of Ser. No. 850,084, Mar. 19, 1992, abandoned.

[51] Int. Cl.5 ............................................. F16L 3/04
[52] U.S. Cl. ................................. 285/158; 285/162; 285/319; 285/370; 285/423; 285/903; 285/921
[58] Field of Search ............... 285/319, 903, 423, 397, 285/398, 370, 371, 921, 162, 158

[56] References Cited

U.S. PATENT DOCUMENTS

| | | | |
|---|---|---|---|
| 1,188,485 | 6/1916 | Pruyn | 285/397 X |
| 3,986,731 | 10/1976 | DeHoff | 285/371 X |
| 4,032,178 | 6/1977 | Neuroth | 285/162 |
| 4,082,327 | 4/1978 | Sting et al. | 285/401 |
| 4,247,136 | 1/1981 | Fouss et al. | 285/397 X |
| 4,468,535 | 8/1984 | Law | 174/65 R |
| 4,880,387 | 11/1989 | Stikeleather et al. | 439/98 |
| 4,900,068 | 2/1990 | Law | 285/161 |
| 4,989,905 | 2/1991 | Rajecki | 285/319 |
| 4,990,721 | 2/1991 | Sheehan | 174/65 R |

OTHER PUBLICATIONS

Coupler—"Carlon" A 24D D ½ENT Aussie Duct—System 2000.
"PMA Fix 02" Hummel PG 16.

Primary Examiner—Dave W. Arola
Attorney, Agent, or Firm—Auslander & Thomas

[57] ABSTRACT

A fitting or connecting corrugated tubing has a through opening and a liquid tight corrugated tubing connecting portion. The connecting portion has a shank to receive the corrugated tubing and a collar of greater diameter than the shank. The collar extends along the shank from a shoulder in the fitting and terminates before the end of the shank. Pawls in the connecting portion extend from the shank between the collar and the end of the shank. The pawls are hinged and have bevels and a bearing surface. The collar on the shank has an outside diameter slightly greater than the inside diameter of the corrugated tubing which renders the connector liquid tight when engaged with the corrugated tubing. The pawls resiliently extend to engage themselves in an inner corrugation of the corrugated tubing. Various pawl configurations engage the inside corrugations of corrugated tubing for a quick and firm liquid tight connection.

21 Claims, 8 Drawing Sheets

LIQUID TIGHT INTERNAL SNAP CONNECTOR FOR CONNECTING CORRUGATED PLASTIC CONDUIT

The present invention is a continuation-in-part of Ser. No. 07/850,084 filed Mar. 12, 1992 and now abandoned.

BACKGROUND OF THE INVENTION

The Field of the Invention

The present invention is a fitting with a liquid tight internal snap connector for connecting corrugated tubing. The fitting can snap into, or be screw affixed in an aperture or a junction box, and the fitting may even be in the form of a coupler.

Attaching or coupling corrugated tubing in a liquid tight manner is different from just attaching tubing or conduits. There is also a difference between external and internal snap connectors for corrugated tubing, particularly liquid tight connectors.

There are also distinctive differences between liquid tight fittings for conduits and tubing, both for regular and corrugated tubing, that are pass through fittings.

Corrugated tubing also has its variations with different problems for attaching with an internal snap connector, since corrugations may be regular or helical.

The present invention is an internal liquid tight snap connector specifically for a non helical corrugation.

Fittings, whether couplings or fittings for apertures or junction boxes for connecting non helical corrugated tubing in the past, had openings therethrough through which liquid might enter. Prior art fittings generally were bulky, not easy to use, time or labor consuming to install.

The interference fit of the internal liquid tight snap connector of the present invention for a non helical corrugation is quick to connect, liquid tight and push connectable.

Description of the Related Art

A typical prior art device for plastic corrugated tubing is a coupler external of the corrugated tubing having a tube with an internal shoulder and two sets of resilient fingers in openings along the longitudinal axis of the coupler. The corrugated tubing may be push inserted at both ends of the coupler. The couple is trademarked CARLON ® and marked "A 240 D ½″ ENT".

In another type of prior art device for plastic corrugated tubing, has a single cup, external of the corrugated tubing, an internal shoulder and one set of resilient fingers in openings along the longitudinal axis of the cup. The cup has an extending threaded portion. The corrugated tubing may be push inserted at one end of the cup. The device is trademarked AUSSIE DUCT ® and marked "System 2000".

There are, of course, other non push fit external devices for plastic corrugated tubing having a single cup external of the corrugated tubing, an internal shoulder and a resilient clip or a finger in the shank of the cup, the cups having extending threaded portions. These are marked respectively, "PMA FIX 02" and HUMMEL "PG 16".

Typical of the prior art, U.S. Pat. No. 4,900,068 discloses a prior art external liquid tight fitting for a non corrugated conduit which is screw fittable into a junction box.

Also typical of the prior art, U.S. Pat. No. 4,468,535 is a liquid tight fitting for a metallic helical corrugated conduit which is screw fittable into a junction box. The fitting includes a ferrule that is screw fittable inside the metallic helical corrugated conduit.

U.S. Pat. Nos. 4,990,721, 4,880,387, 4,032,178 and 2,823,932 are representative of prior art, of snap in metal fittings.

U.S. Pat. No. 4,247,136 discloses a push fit non liquid tight internal snap fitting coupler for corrugated tubing. The coupler includes axially pivotable cleats for engaging the corrugated tubing.

U.S. Pat. No. 4,989,905 discloses a push fit non liquid tight external snap fitting coupler ring for corrugated tubing. The coupler ring includes axially pivotable cleats for engaging the corrugated tubing and a fitting body to engage the corrugated tubing.

U.S. Pat. No. 4,082,327 discloses a push and rotate fit non liquid tight internal connector end for corrugated tubing. The connector includes detents for engaging the corrugated tubing.

SUMMARY OF THE INVENTION

The liquid tight internal snap connector for connecting corrugated tubing of the present invention provides an easy to use connector for engaging corrugated conduit or tubing in a fitting. It is a labor saving quick connect, liquid tight connector for push engaging corrugated tubing onto a connector in an interference fit, rendering the connection liquid tight for most liquid tight application, such as outdoor use. The liquid tight internal snap connector for corrugated tubing may be in a snap fitting or screw fitting for an aperture or a junction box or as a coupler. The internal nature of engaging the corrugated tubing simplifies the problem of liquid tightness with no external openings in the connector and also provides a trim, non bulky fitting. The gentle camber at the end of the interference fit collar facilitates engagement of the corrugated tubing. The shank of the liquid tight internal snap connector for connecting corrugated tubing rigidizes the engaged corrugated tubing.

According to the present invention, a fitting for connecting corrugated tubing has a through opening and a liquid tight corrugated tubing connecting portion. The connecting portion has a shank to receive the corrugated tubing and a collar of greater diameter than the shank. The collar extends along the shank from a shoulder in the fitting and terminates before the end of the shank. Pawls in the connecting portion extend from the shank between the collar and the end of the shank. The pawls are hinged and have bevels and a bearing surface. The collar on the shank has an outside diameter slightly greater than the inside diameter of the corrugated tubing. The pawls resiliently extend to engage themselves in an inner corrugation of the corrugated tubing.

The collar may have a camber at the shank extending portion and the fitting may have an aperture engaging portion. The fitting may be a coupler.

The hinge means may have a hinge extending axially with regard to the shank flexing the pawl radially, or the hinge means may have a hinge extending annularly with regard to the shank and flexing the pawl radially. There may be two pawls, four pawls or two sets of two pawls. The sets of two pawls may be adjacent and apposed to each other.

The aperture engaging portion may have an O ring. The aperture engaging portion may have a snap fitting and the snap fitting may have fingers and shoulders. The aperture engaging portion may have screw threads and a threaded nut. The hinge means may be resilient and biased to flex outward of the shank. The corrugated tubing may be plastic and non helical.

The present invention includes a method for connecting corrugated tubing by providing the corrugated tubing, push fitting it over the shank of the connecting portion of the fitting and engaging the pawls with an inner corrugation of the corrugated tubing. The corrugated tubing may be pushed to abut a shoulder. The same procedure may be used where the fitting has a portion to engage an aperture, then the fitting may be engaged in an aperture. The same method with a fitting having screw threads to engage in an aperture may be used and a nut is then attached.

Although such novel feature or features believed to be characteristic of the invention are pointed out in the claims, the invention and the manner in which it may be carried, may be further understood by reference to the description following and the accompanying drawing.

DETAILED DESCRIPTION

Referring now to the figures in greater detail, where like reference numbers denote like parts in the various figures.

Figure 1:
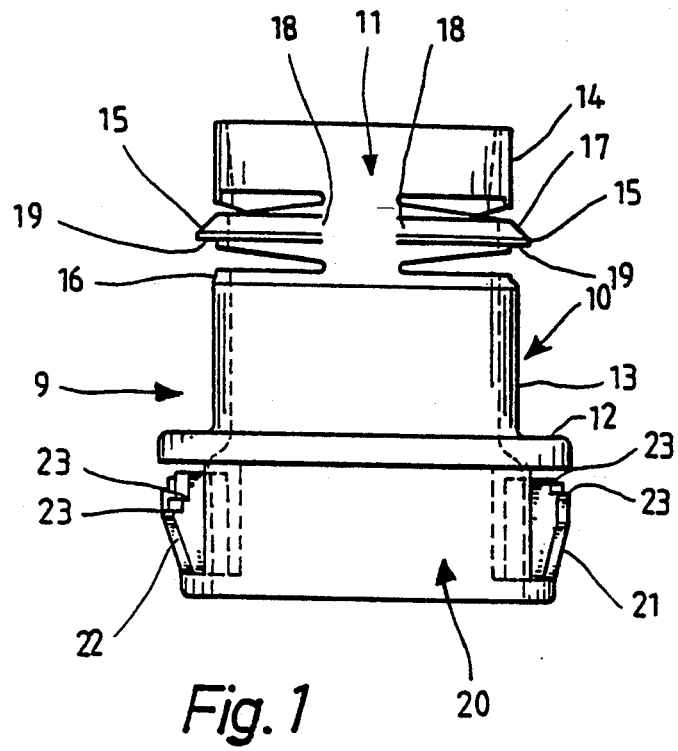
FIG. 1 is an elevation of a fitting including a liquid tight internal snap connector for connecting corrugated tubing of the present invention.
Figures 2, 3:
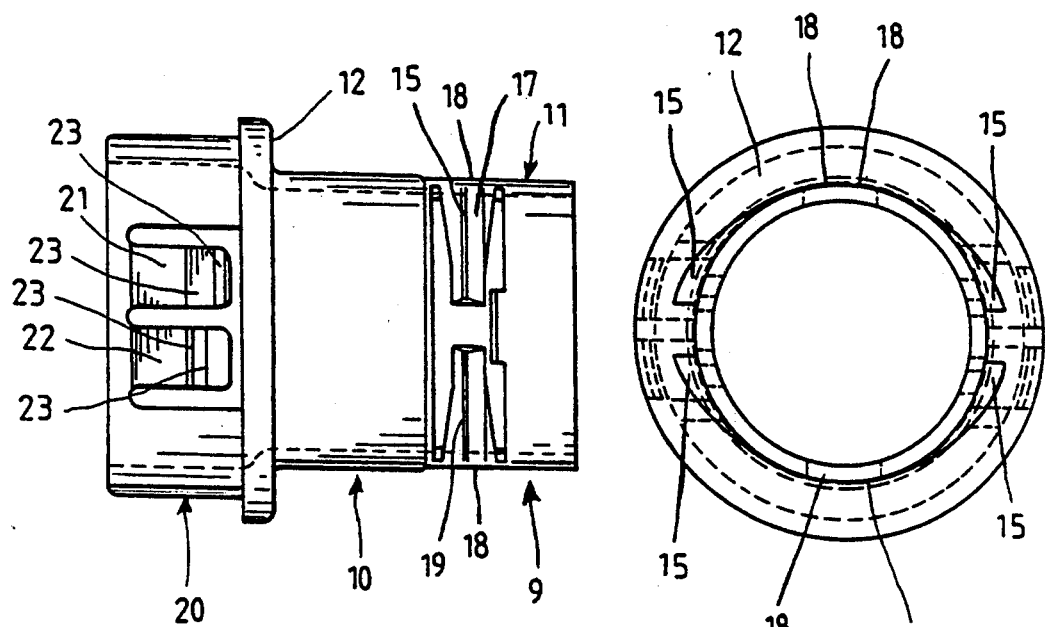
FIG. 2 is a side view of FIG. 1.
FIG. 3 is an end view of FIG. 2.
Figure 4:
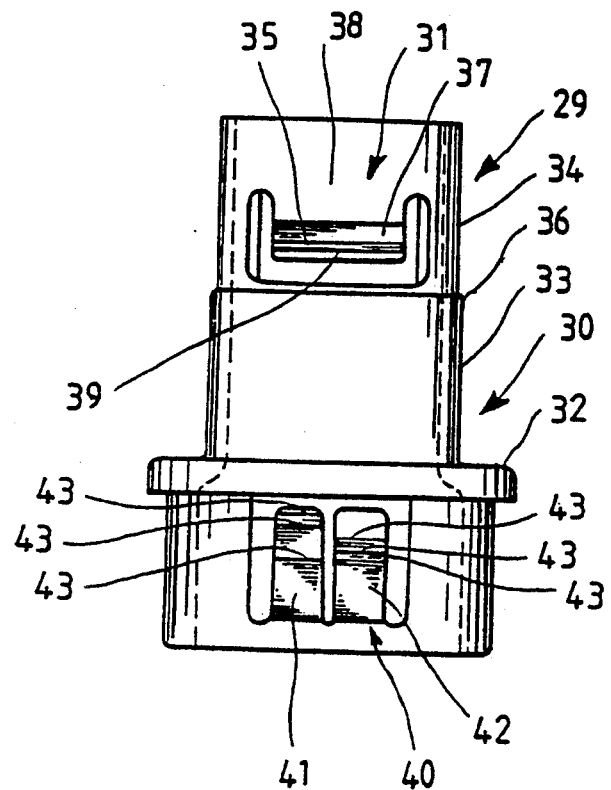
FIG. 4 is an elevation of another embodiment of a fitting including a liquid tight internal snap connector for connecting corrugated tubing of the present invention.
Figure 5:
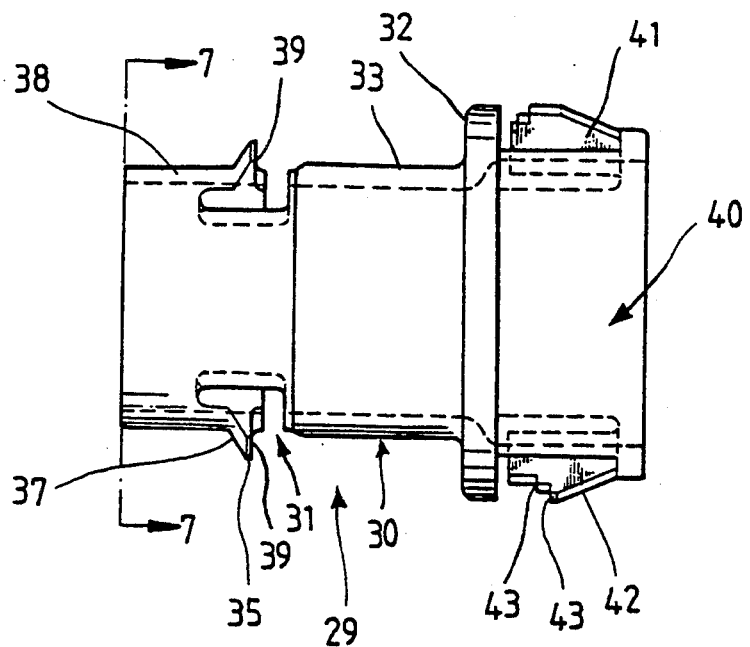
FIG. 5 is a side view of FIG. 4.
Figure 6:
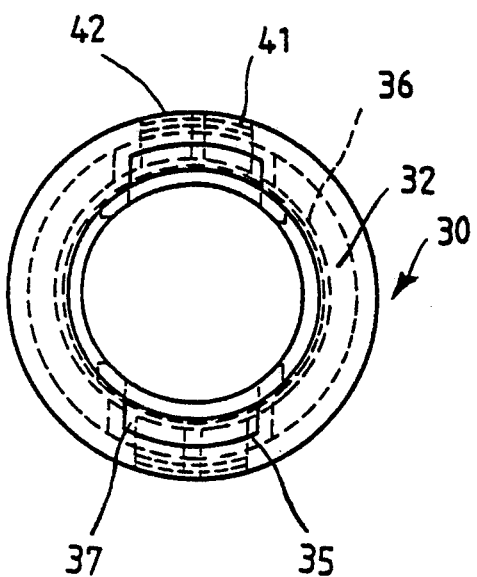
FIG. 6 is an end view of FIG. 5.
Figure 7:
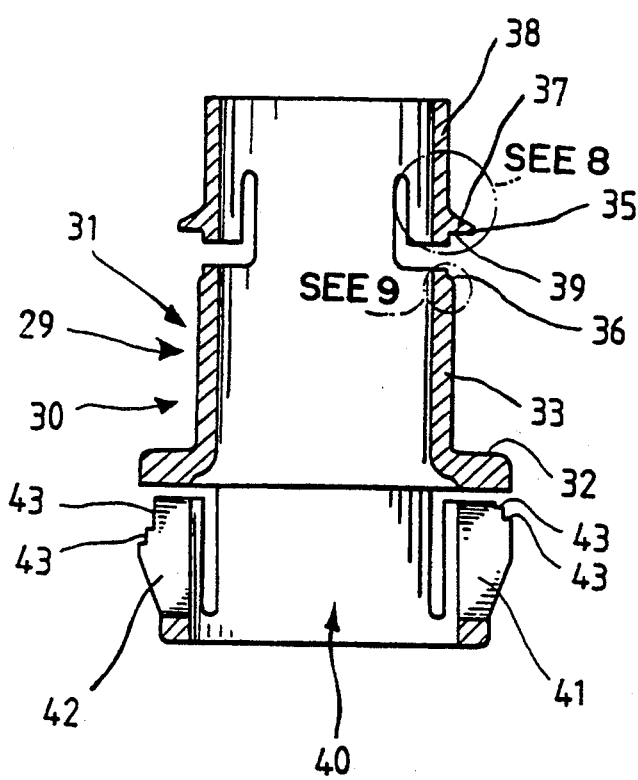
FIG. 7 is a section of FIG. 5 at lines 7—7.
Figure 8:
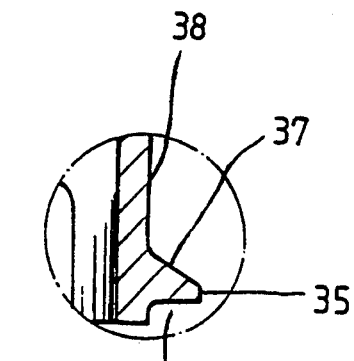
FIG. 8 is a detail of the snap means of the connector of FIG. 7.
Figure 9:
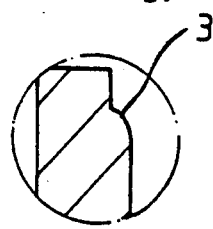
FIG. 9 is a detail of the interference fit of FIG. 7.

As shown in FIGS. 1-3, the liquid tight internal snap connector 10 has a shank 11 extending from a shoulder 12. There is a collar 13 on the shank 11 extending from the shoulder 12 and a shank inset 14 extends from the collar 13. Pawls 15 extend from the shank inset 14 and beyond the circumference of the collar 13. There is a camber 16 at the end of the collar 13. The pawls 15 have bevels 17. The pawls 15 extend annularly with regard to the shank 11 and outward from an open portion of the shank inset 14. The pawls 15 have hinges 18 which extend axially with regard to the shank 11 and flex radially with regard to the shank 11. There are bearing surfaces 19 beneath each pawl 15.

Beyond the shoulder 12 is a conventional aperture engaging means 20 including fingers 21 and 22 including shoulders 23 for engaging the fitting 9 in an aperture.

The snap connector 30 as shown in FIGS. 4-10 has a shank 31 extending from a shoulder 32. There is a collar 33 on the shank 31 extending from the shoulder 32 and a shank inset 34 extends from the collar 33. Pawls 35 extend annularly from the shank inset 34 and beyond the circumference of the collar 33. There is a camber 36 at the end of the collar 33. The pawls 35 have bevels 37. The pawls 35 extend annularly with regard to the shank and outward from an open portion of the shank inset 34. The pawls 35 have hinges 38 which extend annularly with regard to the shank and flex longitudinally with regard to the shank 31. There are bearing surfaces 39 beneath each pawl 35.

Beyond the shoulder 32 is a conventional aperture engaging means 40 including fingers 41 and 42, including shoulders 43 for engaging the fitting 29 in an aperture.

Figure 11:
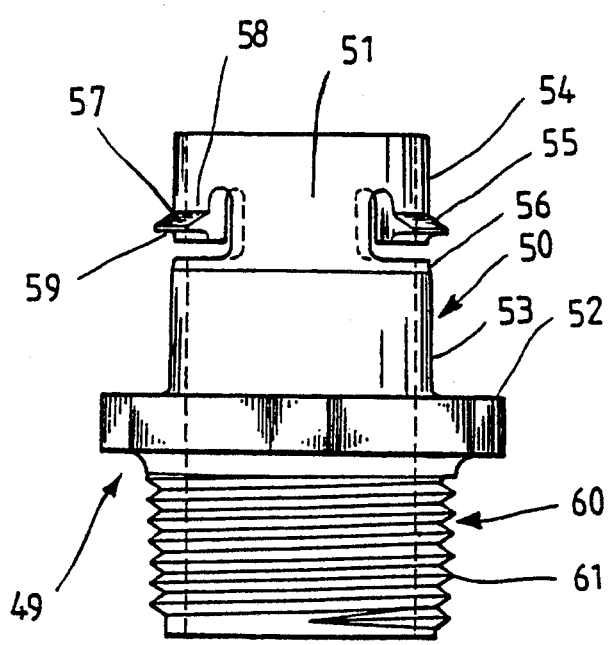
FIG. 11 is an elevation of another embodiment of a fitting including a liquid tight internal snap connector of the present invention for connecting corrugated tubing, including a threaded end.
Figure 12:
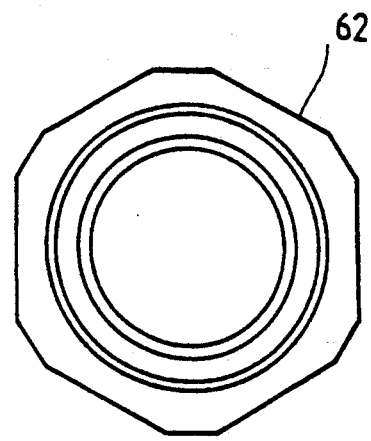
FIG. 12 is a plan view of a nut for the threaded end of the fitting for the liquid tight internal snap for connecting corrugated tubing of FIG. 11.
Figure 13:
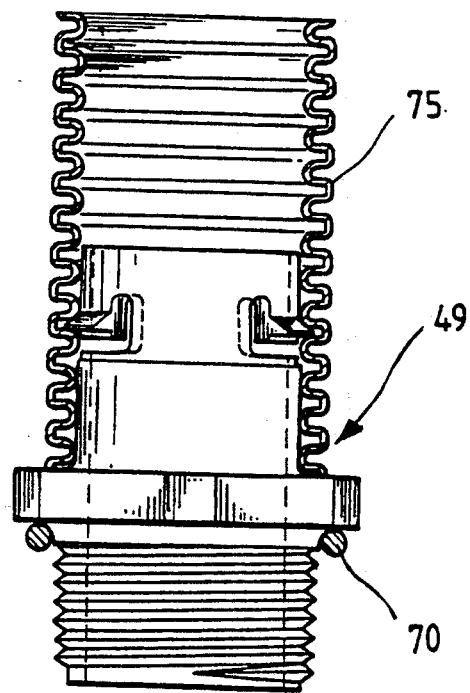
FIG. 13 is a view of a fitting including a liquid tight internal snap connector for connecting corrugated tubing of FIG. 11 including corrugated tubing in section and an O ring in section.

The snap connector 50, as shown in FIGS. 11-13, has a shank 51 extending from a shoulder 52. There is a collar 53 on the shank 51 extending from the shoulder 52 and a shank inset 54 extends from the collar 53. Pawls 55 extend annularly from the shank inset 54 and beyond the circumference of the collar 53. There is a camber 56 at the end of the collar 53. The pawls 55 have bevels 57. The pawls 55 extend annularly with regard to the shank 51 and outward from an open portion of the shank inset 54. The pawls 55 have hinges 58 which extend annularly with regard to the shank 51 and flex longitudinally with regard to the shank 51. There are bearing surfaces 59 beneath each pawl 55.

Beyond the shoulder 52 is a conventional threaded aperture engaging means 60 including threads 61 engagable with a nut 62 to hold the fitting 49 in an aperture. The snap connector 50 may be used with an O ring 70 for liquid tight engagement.

As shown in FIGS. 14-17, the liquid tight internal snap connector 80 has a shank 81 extending from a shoulder 82. There is a collar 83 on the shank 81 extending from the shoulder 82 and a shank inset 84 extends from the collar 83. Pawls 85 extend annularly from the shank inset 84 and beyond the circumference of the collar 83. There is a camber 86 at the end of the collar 83. The pawls 85 have bevels 87. The pawls 85 extend annularly with regard to the shank 81 and outward from an open portion of the thank inset 84. The pawls 85 have hinges 88 which extend axially with regard to the shank 81 and flex radially with regard to the shank 81. There are bearing surfaces 89 beneath each pawl 85.

Beyond the shoulder 82 is a conventional threaded aperture engaging means 90 including threads 91 engagable with a nut (not shown) to hold the fitting 79 in an aperture. The fitting 79 may be used with an O ring 70 for liquid tight engagement (not shown).

Figure 18:
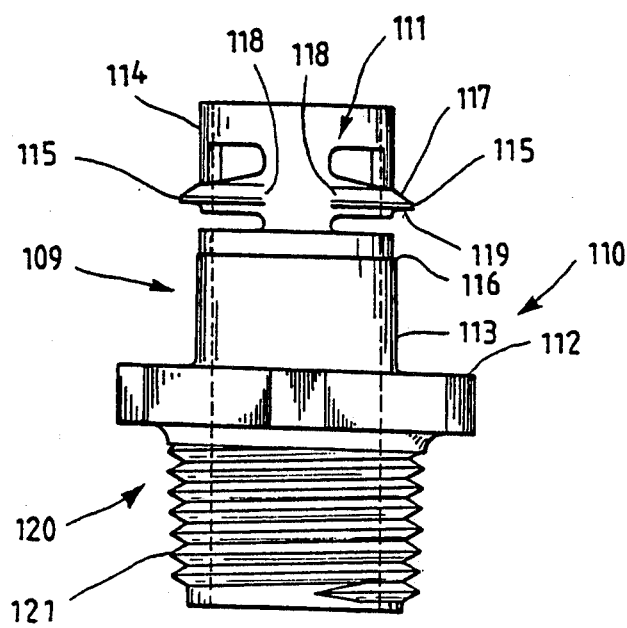
FIG. 18 is an elevation of another embodiment of a fitting including a liquid tight internal snap connector for connecting corrugated tubing of the present invention.
Figures 19, 20:
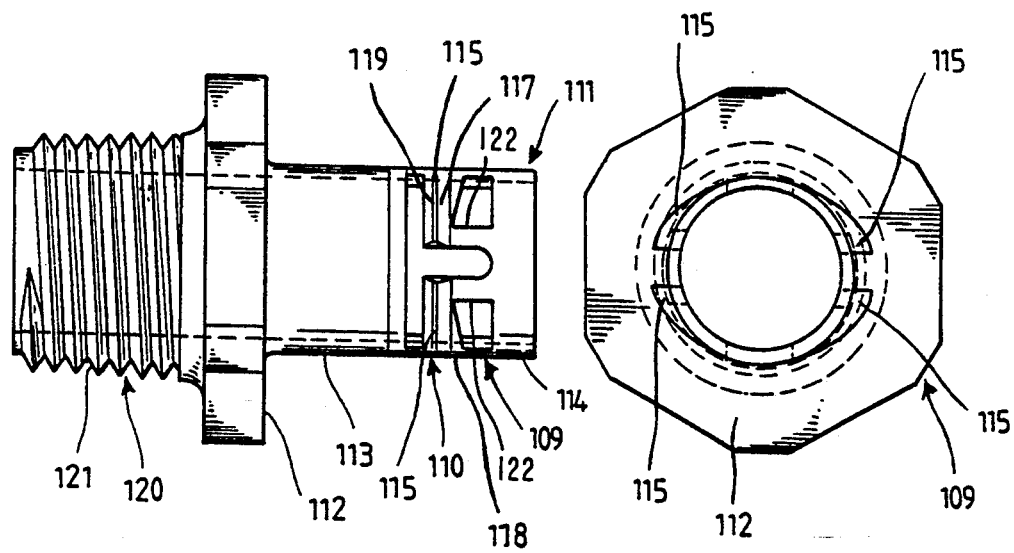
FIG. 19 a side view of FIG. 18.
FIG. 20 is an end view of FIG. 19.

As shown in FIGS. 18–20, the liquid tight internal snap connector 110 has a shank 111 extending from a shoulder 112. There is a collar 113 on the shank 111 extending from the shoulder 112 and a shank inset 114 extends from the collar 113. Pawls 115 extend annularly from the shank inset 114 and beyond the circumference of the collar 113. There is a camber 116 at the end of the collar 113. The pawls 115 have bevels 117. The pawls 115 extend annularly with regard to the shank 111 and outward from an open portion of the shank inset 114. The pawls 115 have hinges 118 which extend axially with regard to the shank 111 and flex radially with regard to the shank 111. There are bearing surfaces 89 beneath each pawl 115.

Beyond the shoulder 112 is a conventional threaded aperture engaging means 120 including threads 121 engagable with a nut (not shown) to hold the fitting 109 in an aperture. The fitting 109 may be used with an O ring 70 for liquid tight engagement (not shown).

Operation

Figure 10:
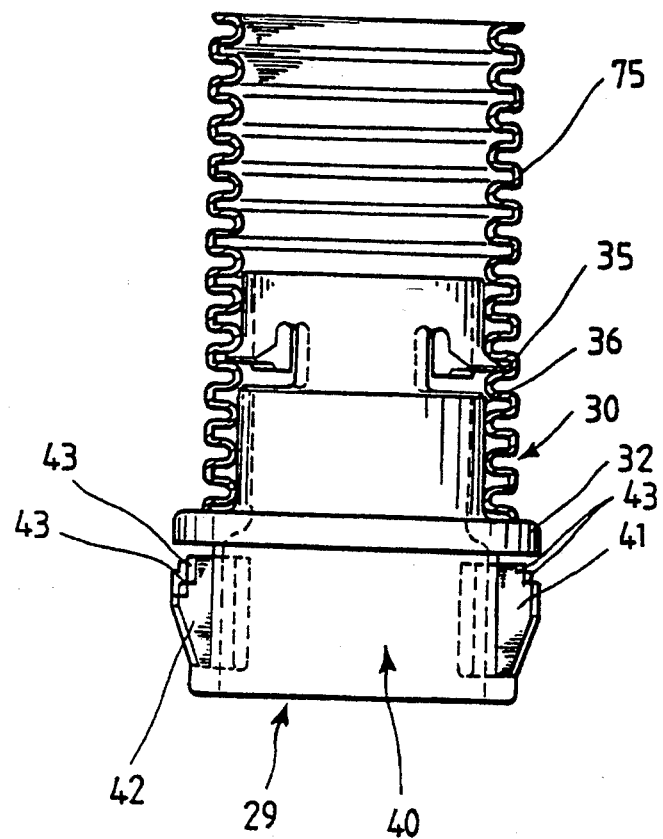
FIG. 10 is a view of the fitting including a liquid tight internal snap connector for connecting corrugated tubing as shown in FIG. 4, including corrugated tubing in section.

As can best be seen in FIGS. 7–10, the camber 36 forms a bearing surface extending from the shank inset 34 so that corrugated tubing 75, such as shown in FIG. 10, can be push engaged over the collar 33. The bevels 37 of the pawls 35 cam against the inner corrugations of the corrugated tubing 75 flexing on the hinges 38. The corrugated tubing 75 is stopped at the shoulder 32. Preferably, three corrugations of the corrugated tubing 75 override the collar 33 forming a liquid tight interference fit that is sufficient at least for most outdoor applications.

The pawls 35, once engaged in a corrugation of the corrugated tubing 75, are firmly engaged against slippage or removal by the bearing surface 39 which is flat and will not slip out of its engagement in the corrugation of the corrugated tubing 75.

The shank 31 extends from the shoulder 32 to the end of the snap connector 30. The length of the shank 31 holds the snap connector 30 rigidly within the corrugated tubing 75 beyond the hinges 38 so that it is not likely to twist or otherwise be disengaged from the corrugation of the corrugated tubing 75.

There also tends to be a tensioning action between the corrugated tubing 75 interposed in engagement with the shoulder 32 of the snap connector 30 and the bearing surface 39, helped by the resilience of the corrugated tubing 75, which adds to the stability of the interference fit and also to the liquid tight nature of the assembly.

The aperture engaging means 40 is well known in the prior art, but in combination in the fitting 29, is particularly labor saving in that the assembly of the fitting 29 and corrugated tubing 75 in an aperture is effected very quickly by push engagement.

An O ring 70 could be used, even with the aperture engaging means 40, to improve liquid tight engagement.

In the snap connector 10, as shown in FIGS. 1–3, the camber 16 forms a bearing surface extending from the shank inset 14 so that corrugated tubing 75 such as shown in FIG. 10 can be push engaged over the collar 13. The bevels 17 of the pawls 15 cam against the inner corrugations of the corrugated tubing 75 flexing on the hinges 18.

The pawls 15, once engaged in a corrugation of the corrugated tubing 75, are firmly engaged against slippage or removal by the bearing surface 39 which is flat and will not slip out of its engagement in the corrugation of the corrugated tubing 75.

The pawls 15 extend from hinges 18 and flex radially from the shank inset 14 in two set of opposing pawls 15.

As shown in FIGS. 11–13, the aperture engaging means 60 of the snap connector 50, is well known in the prior art. The aperture engaging means 60 includes threads 61 which are engagable with a nut 62 in an aperture. The threads 61 are preferably National Pipe Threads. The aperture engaging means 60 may be used in conjunction with an O ring 70 as shown in FIG. 13 for liquid tight engagement in an aperture when fixed with the nut 62.

As shown in FIGS. 14–17, the aperture engaging means 90 of the snap connector 80, is well known in the prior art. The aperture engaging means 90 includes threads 91 which are engagable with a nut (not shown) in an aperture. The threads 91 are preferably National Pipe Threads.

The pawls 85, once engaged in a corrugation of the corrugated tubing 75, are firmly engaged against slippage or removal by the bearing surface 89 which is flat and will not slip out of its engagement in the corrugation of the corrugated tubing 75.

The pawls 85 extend from hinges 88 and flex radially from the shank inset 84 in a set of two diametrically opposing pawls 85.

As shown in FIGS. 18–20 the aperture engaging means 120 of the snap connector 110 is well known in the prior art. The aperture engaging means 120 includes threads 121 which are engagable with a nut (not shown) in an aperture. The threads 121 are preferably National Pipe Threads.

The pawls 115, once engaged in a corrugation of the corrugated tubing 75, are firmly engaged against slippage or removal by the bearing surface 119 which is flat and will not slip out of its engagement in the corrugation of the corrugated tubing 75.

The pawls 115 extend from hinges 118 and flex radially from the shank inset 114 in a set of two diametrically opposing pawls 115. The pawls 115 are integrally tied to the shank 111 at the end of the pawls 115 by being integrally attached to ties 122 which support the pawls 115 against undesired axial movement.

Although the edges of the inner corrugations of the corrugated tubing 75 tend to be rounded, it is still preferable to provide cambers 16, 36, 56, 86, 116 on the collars 13, 33, 53, 83, 113 in order to better effect and easy push engaged of the liquid tight interference fit of the present invention.

In connecting corrugated tubing 75, regular nonmetallic, nonhelical corrugated tubing 75 is quickly press fit over the shanks 11, 31, 51, 81 and 111. The inner corrugations of the corrugated tubing 75 slide over the bevels 17, 37, 57, 87 and 117 of the pawls 15, 35, 55, 85 and 115. The pawls 15, 35, 55, 85 and 115 flex inward against the outward biasing of their hinges 18, 38, 58, 88 and 118 until the end of the corrugated tubing 75 abuts the shoulders 12, 32, 52, 82 and 112. The pawls 15, 35, 55, 85 and 115 are resiliently biased by the hinges 18, 38, 58 and 88 to engage an inner corrugation of the corrugated tubing 75, as shown in FIGS. 10 and 13. The inner corrugations of the tubing 75 ride over the cambers 16, 36, 56, 86 and 116 and form a very tight interference fit by a simple push connection, which is liquid tight. The shanks 11, 31, 51, 81, and 111, as can be seen in FIGS. 10 and 13, support the corrugated tubing 75, rigidly, so that there is little or no likelihood that the pawls 15, 35, 55, 85 and 115 can disengage themselves by twisting. The flat bearing portions surfaces 19, 39, 59, 89 and 119 strongly hold the corrugated tubing 75 against being removed by pulling.

The aperture engaging means 20 and 40 are further adapted to snap connect in apertures, either before or after the corrugating tubing 75 has been engaged.

The aperture engaging means 60, 90, and 120 are easily connected in an aperture or junction box and can be in place before or after the corrugating tubing 75 is connected to the fittings 9, 29, 49, 79 and 109.

The nut 62 is engagable with the threads 61, 91 and 121 for fixing the fitting 49, 79 and 109 in the opening, aperture or junction box.

The shank 81, on the fitting 79, is a smaller diameter shank for a smaller diameter corrugated tube 75.

Figure 14:
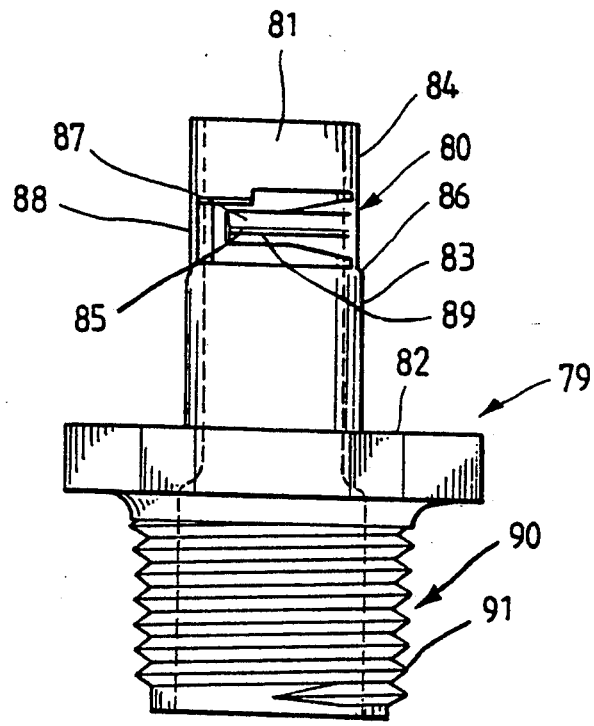
FIG. 14 is an elevation of another embodiment of a fitting including a liquid tight internal snap connector of the present invention for connecting corrugated tubing.
Figure 15:
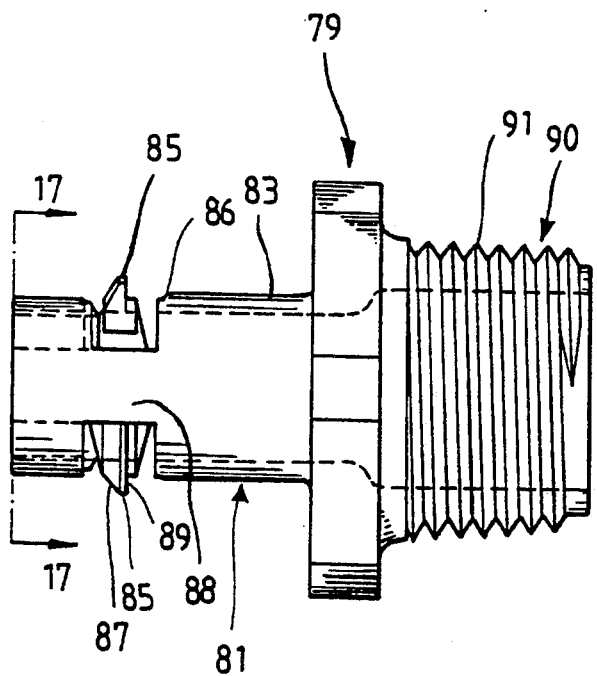
FIG. 15 is a side view of FIG. 14.
Figure 16:
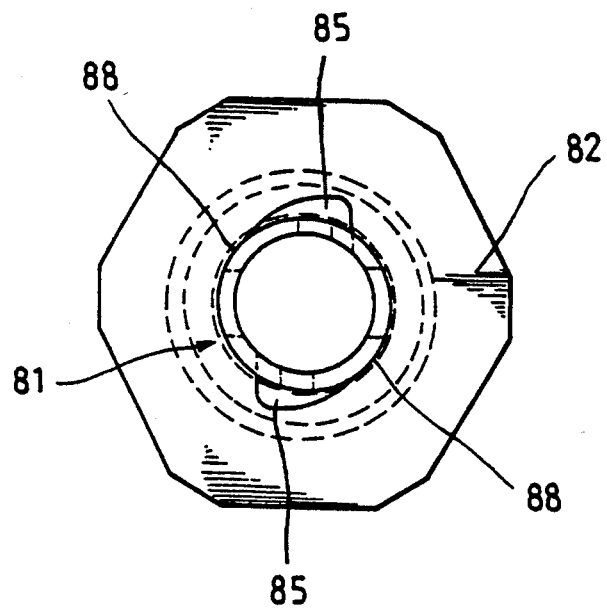
FIG. 16 is an end view of FIG. 15.
Figure 17:
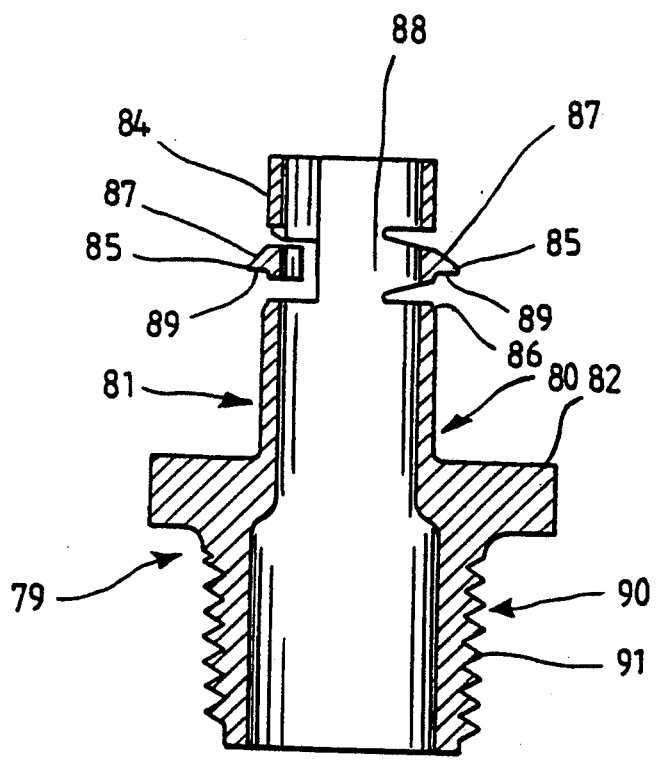
FIG. 17 is a section of FIG. 15 at lines 17—17.

The pawls 85, as shown in FIGS. 14, through 17, are near semicircular and on opposite sides of the shank 81. The pawls 15 as shown in FIGS. 1-3 are in two sets of two apposed pawls, having gaps between the ends of the pawls 15. These gaps enable an inner flexing during installation without the pawls 15 interfering with each other during such flexure. The pawls 115, as shown in FIGS. 18-20, are tied to the shank 111 by the ties 122.

The length of the collars 13, 33, 53, 83, and 113 preferably is equal to three corrugations. The diameter of the collars 33, 53, 83, and 113 is slightly greater than the inside diameter of the corrugated tubing 75 and render snap connectors 10, 30, 50, 80, and 110 surprisingly liquid tight and available for outdoor use.

The internal grasping of the pawls 15, 35, 55, 85 and 115 necessitate the corrugated tubing 75, covering the openings in the shank 11, 31, 51, 81 and 111, so that there are no exposed openings to threaten the liquid tight integrity of the snap connectors 10, 30, 50, 80, and 110. The internal structure of the present invention, combined with the interference fit of collars 13, 33, 53, 83 and 113, combine in an inexpensive labor saving fitting 9, 29, 49, 79, and 109, to both save labor and assembly and cost in fabrication.

The cambers 16, 36, 56, 86 and 116 are helpful in forming the quick connect press fit interference fitting of the present invention and are preferably employed, although the inner rounding of the inner corrugations of the corrugated tubing 75 may permit an adequate press fitting for a quick connect without the bearing surfaces 19, 39, 59, 89 and 119, in some instances.

The bearing surfaces 19, 39, 59, 89 and 119 neither increase nor decrease the liquid tight integrity of the snap connectors 10, 30, 50, 80 and 110.

The thinner wall of the shank insets 14, 34, 54, 84 and 115 enable greater flexibility and resilience of the hinges 18, 38, 58, 88 and 118. The shank insets 14, 34, 54, 84, and 115 also help serve as a guide for connecting the corrugated tubing 75 before it reaches the interference fit with the collars 13, 33, 53, 83 and 113.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A fitting connecting non helical plastic corrugated tubing having an alternating small inside diameter and a larger inside diameter of said corrugations, said fitting including an opening therethrough, a liquid tight corrugated tubing connecting portion for receiving one end of said corrugated tubing thereover in liquid tight engagement, said liquid tight corrugated tubing connecting portion including a shank, said shank having an outside diameter and an end, a shoulder, at least one pawl, said at least one pawl including hinge means a bevel and a bearing surface, said at least one pawl resiliently extending to engage itself within said larger inside diameter of said corrugations, and a collar on said shank, said collar having an outside diameter, said collar's outside diameter greater than said shank's outside diameter and slightly greater than said small inside diameter of said corrugations and receiving said last mentioned corrugations thereover in liquid tight engagement, said collar extending along said shank from said shoulder and having a termination spaced away from said shank end, said pawl extending from said shank between said collar termination and said shank end.

2. The invention of claim 1 wherein said collar includes a camber at said termination.

3. The invention of claim 1 wherein said fitting includes an aperture engaging portion.

4. The invention of claim 3 wherein said aperture engaging portion includes an O ring.

5. The invention of claim 3 wherein said aperture engaging portion includes a snap fitting.

6. The invention of claim 5 wherein said a snap fitting include fingers.

7. The invention of claim 6 wherein said fingers include shoulders.

8. The invention of claim 3 wherein said aperture engaging portion includes screw threads.

9. The invention of claim 8 wherein said aperture engaging portion includes a threaded nut.

10. The invention of claim 1 wherein said fitting is a coupler.

11. The invention of claim 1 wherein said hinge means includes at least one hinge, said at least one hinge extending axially with regard to said shank flexing said pawl radially.

12. The invention of claim 1 wherein said hinge means includes at least one hinge, said at least one hinge extending annularly with regard to said shank and flexing said pawl radially.

13. The invention of claim 1 including at least two pawls.

14. The invention of claim 1 including four pawls.

15. The invention of claim 14 wherein said pawls include two sets of two pawls.

16. The invention of claim 15 wherein at least one of said sets of pawls comprises two adjacent pawl apposed to each other.

17. The invention of claim 1 wherein said hinge means are resilient.

18. The invention of claim 17 wherein said hinge means are biased to flex outward of said shank.

19. The invention of claim 1 wherein at least one of said at least one pawl includes a tie to said shank.

20. The invention of claim 1 wherein said liquid tight corrugated tubing connection portion has a longitudinal axis and said at least one pawl extends along the circumference of said shank at a right angle to said longitudinal axis.

21. The invention of claim 1 in combination with said corrugated tubing wherein said corrugated tubing is plastic.

* * * * *